United States Patent [19]

Heidsiek et al.

[11] Patent Number: 4,624,832

[45] Date of Patent: Nov. 25, 1986

[54] EYEGLASS FRAMES MADE OF NI ALLOY

[75] Inventors: Horst Heidsiek, Hanau; Gernot Jäckel, Hasselroth; Horst Becker, Rodenbach, all of Fed. Rep. of Germany

[73] Assignee: Degussa Aktiengesellschaft, Frankfurt am Main, Fed. Rep. of Germany

[21] Appl. No.: 667,891

[22] Filed: Nov. 2, 1984

[30] Foreign Application Priority Data

Nov. 5, 1983 [DE] Fed. Rep. of Germany ....... 3340054

[51] Int. Cl.$^4$ ............................................. C22C 19/03
[52] U.S. Cl. .................................. 420/442; 420/445; 420/446; 420/447; 420/448; 420/450; 420/451; 420/457; 420/587
[58] Field of Search ............... 420/442, 445, 446, 447, 420/448, 450, 451, 457, 587; 29/20; 351/102, 154

[56] References Cited

U.S. PATENT DOCUMENTS 1,716,050  6/1929  Grosvenor et al. ................ 420/457

FOREIGN PATENT DOCUMENTS 1218161  6/1966  Fed. Rep. of Germany ...... 420/442
3213738  11/1982  Fed. Rep. of Germany ...... 351/102
0102823  9/1978  Japan .................................. 420/442

Primary Examiner—L. Dewayne Rutledge
Assistant Examiner—Robert L. McDowell
Attorney, Agent, or Firm—Cushman, Darby & Cushman

[57] ABSTRACT

New nickel alloys are described which are useful for eyeglass frames, which alloys in addition to good resistance to corrosion also have good workability properties. They contain 5 to 20 percent copper and 5 to 30 percent zinc. Optionally, they can also be alloyed in small amounts other metals such as manganese, silicon, beryllium, cobalt, aluminum, niobium, tantalum, or titanium.

11 Claims, No Drawings

EYEGLASS FRAMES MADE OF NI ALLOY

BACKGROUND OF THE INVENTION

The invention is directed to the use of nickel alloys for eyeglass (spectacle) frames and spectacle parts.

Eyeglass frames and eyeglass parts are frequently made of metals or metal alloys. Thereby, there are chiefly used copper alloys, such as, e.g., tin bronze (CuSn 6, CuSn 8), copper-bronze (Cu82 Ni2 Sn5 Zn 11) and new silver or nickel alloys which are distinguished by good workability, but have a high susceptibility to corrosion so that the eyeglass parts made of these materials must be provided with coatings made of more noble metals or alloys. The use of such compound materials, however, is unsatisfactory since even the smallest pores in the coatings permit corrosion of the supporting materials and glasses in use are subjected to an abrasive wear which after some time exposes the non-noble support material.

In recent times, there have been proposed for spectacle parts nickel—chromium and nickel-chromium-silver alloys (German OS No. 3045334) which we distinguished by good resistance to corrosion, but have a dificient workability. Thus, e.g., a nickel alloy having 10 to 15 percent chromium is only poorly workable by machining since it is inclined to weld to the tool. Indeed, the machining workability can be improved by the addition of about 1 percent of silver to the nickel-chromium but this is purchased as the expense of a higher material cost and a difficult working technique. The shaping of these materials without machining also is difficult since both types of materials (Ni-Cr, Ni-Cr-Ag) have a very steep hardening characteristic with increasing degree of mechanical working and so must be repeatedly soft annealed. Besides the mechanical working only succeeds with special rolls and special draw nozzles.

Therefore, it was the problem of the present invention to develop nickel alloys for eyeglass frames and eyeglass parts which are resistant to corrosion and nevertheless are readily formable and workable.

SUMMARY OF THE INVENTION

This problem was solved according to the invention by using nickel alloys which in addition to nickel contain 5 to 20 percent copper, 5 to 30 percent zinc, 0 to 2 percent manganese, 0 to 2 percent silicon, 0 to 1 percent beryllium, and 0 to 4 percent of each of aluminum and/or chromium and/or molybdenum and/or tungsten and/or vanadium and/or titanium, whereby the total content of beryllium, aluminum, chromium, molybdenum, tungsten, vanadium, and titanium is not more than 6 percent.

Preferably, the alloys contain 8 to 15 percent copper and 8 to 25 percent zinc. Besides, it is favorable for the alloys to have 0 to 0.5 of carbon where chromium, molybdenum, tungsten, vanadium and/or titanium are present.

The nickel-copper-zinc alloys of the invention possess an excellent resistance to corrosion and a good workability. The alternative addition of manganese prevents an embrittlement by sulfur, silicon acts as deoxidation additive in the melts, beryllium, aluminum, chromium, molybdenum, tungsten, vanadium, and titanium improve the spring properties of the material.

Unless otherwise indicated, all parts and percentages are by weight.

The composition can consist essentially of or consist of the stated materials.

DETAILED DESCRIPTION

In the table there are set forth the properties of several known eyeglass materials (7 to 10) and several alloys according to the invention (1 to 6). The resistance to corrosion was determined both with synthetic sweat and also according to DIN 50018 (Germany Industrial Standard 50018).

| Alloy Nr. | Compositon (Wt. %) | | | | Hardness (Vickers) | | Deform-ability | Increase in Hardness | Electro-platability | Resistance to Corrosion |
|---|---|---|---|---|---|---|---|---|---|---|
| | Ni | Cu | Zn | Other element | soft | hard | | | | |
| 1 | 84.5 | 7.6 | 7.8 | Si 0.1 | 105 | 243 | good | flat | very good | very good |
| 2 | 60 | 13 | 27 | — | 112 | 282 | good | medium | very good | good |
| 3 | 71 | 18 | 10 | Mn 0.5 | 108 | 232 | good | flat | very good | good |
| 4 | 73 | 13 | 14 | — | 103 | 240 | good | flat | very good | very good |
| 5 | 78.3 | 10.6 | 10.9 | Be 0.2 | 118 | 260 | good | flat | good | very good |
| 6 | 78.3 | 10.5 | 10.8 | Al 0.4 | 113 | 250 | good | flat | good | very good |
| 7 | 18 | 62 | 20 | — | 100 | 230 | good | flat | very good | unsatisfactory |
| 8 | 68 | 32 | — | Fe 1 Mn 1 | 110 | 260 | satisfactory | steep | good | sufficient |
| 9 | 89 | 1 | — | Cr 10 | 130 | 310 | poor | steep | satisfactory | good |
| 10 | 83 | 1 | — | Cr 15 Ag 1 | 180 | 350 | very poor | very steep | satisfactory | very good |

What is claimed is:

1. An eyeglass frame or eyeglass part consisting essentially of 5 to 20 percent copper, 5 to 30 percent zinc, (a) 0 to 2 percent manganese, (b) 0 to 2 percent silicon, (c) 0 to 1 percent beryllium, and (d) at least one member of the group consisting of 0 to 4 percent each of aluminium, chromium, molybdenum, tungsten, vanadium, or titanium, the total amount of beryllium, aluminium, chromium, molybdenum, tungsten, vanadium, and titanium not exceeding 6 percent, and balance nickel.

2. An eyeglass frame consisting of 5 to 20 percent copper, 5 to 30 percent zinc, and balance nickel.

3. An eyeglass frame according to claim 1 which also includes either (a) manganese, (b) silicon or (c) at least one member of the group consisting of berylium, aluminum, chromium, molybdenum, tungsten, vanadium, and titanium; the manganese or silicon being in an amount up to 2 percent, the beryllium being in an amount up to 1 percent and the aluminum, chromium, molybdenum, tungsten, vanadium or titanium being in an amount up to 4 percent.

4. An eyeglass frame according to claim 1 including silicon, the silicon being in an amount up to 2 percent.

5. An eyeglass frame according to claim 1 including manganese, the manganese being in an amount up to 2 percent.

6. An eyeglass frame according to claim 1 including beryllium, the beryllium being in an amount up to 1 percent.

7. An eyeglass frame according to claim 1 including aluminum, the aluminum being in an amount up to 4 percent.

8. An eyeglass frame according to claim 1 including (a) at least one member of the group consisting of chromium, molybdenum, tungsten, vanadium, and titanium, said at least one member (a) each being in an amount up to 4 percent and (b) 0 to 0.5 percent of carbon.

9. An eyeglass frame according to claim 8 including carbon, the carbon being in an amount up to 0.5 percent.

10. An eyeglass frame according to claim 8 containing 8 to 15 percent copper and 8 to 25 percent zinc.

11. An eyeglass frame according to claim 1 containing 8 to 15 percent copper and 8 to 25 percent zinc.

* * * * *